United States Patent [19]

Fayard et al.

[11] 4,237,861
[45] Dec. 9, 1980

[54] SOLAR ENERGY COLLECTOR USED AS ROOF MEMBER

[76] Inventors: Carlos O. Fayard; Carlos A. Fayard, both of 313 Pettis Ave., Mountain View, Calif. 94041

[21] Appl. No.: 903,313

[22] Filed: May 5, 1978

[51] Int. Cl.³ .................................................. F24J 3/02
[52] U.S. Cl. .................................... 126/417; 126/446; 126/DIG. 2; 165/48 S
[58] Field of Search ............... 126/270, 271, 431, 446, 126/447, 449, 450, 417, DIG. 2; 52/536, 553, 551, 552; 237/1 A; 165/168, 48 S

[56] References Cited

U.S. PATENT DOCUMENTS

| | | | |
|---|---|---|---|
| 801,736 | 10/1905 | Miksch | 52/552 |
| 907,824 | 12/1908 | Latulip | 52/552 X |
| 1,024,322 | 4/1912 | Firoben | 52/552 X |
| 3,434,260 | 3/1969 | Carter | 52/551 X |
| 4,083,360 | 4/1978 | Courvoisier et al. | 126/271 |
| 4,086,913 | 5/1978 | Gavin | 126/271 |
| 4,111,188 | 9/1978 | Murphy, Jr. | 126/271 |
| 4,114,598 | 9/1978 | Von Leeuwen | 126/446 |
| 4,146,014 | 3/1979 | Allegro | 126/450 |
| 4,163,445 | 8/1979 | Stanger | 126/428 |
| 4,164,933 | 8/1979 | Alosi | 165/168 |

FOREIGN PATENT DOCUMENTS

| | | | |
|---|---|---|---|
| 2530152 | 2/1977 | Fed. Rep. of Germany | 126/446 |
| 586880 | 4/1977 | Switzerland | 126/271 |

*Primary Examiner*—James C. Yeung
*Assistant Examiner*—Larry Jones
*Attorney, Agent, or Firm*—John L. McGannon

[57] ABSTRACT

A solar energy collector comprised of a body for use with other such bodies in forming a roof. The body is cast or pressed from a suitable roofing material, such as concrete, plastic, magnesium oxy-chloride, clay and the like with integral color or color coating as desired. The body has projections and recesses at the sides, and ends for allowing the adjacent bodies forming a roof of a building to overlap each other to cover the top of the building. Each body has upper ridges or strips randomly placed and randomly spaced apart to increase the heat capacity thereof and to provide an aesthetic appearance for the body and thereby the roof when the body forms a part of the roof. One or more pipe sections are embedded in the body in the lower surface thereof for allowing water or other liquid to pass into heat exchange relationship with the body to absorb the heat energy therefrom when the body is exposed to solar energy. Several embodiments of the body are disclosed.

6 Claims, 4 Drawing Figures

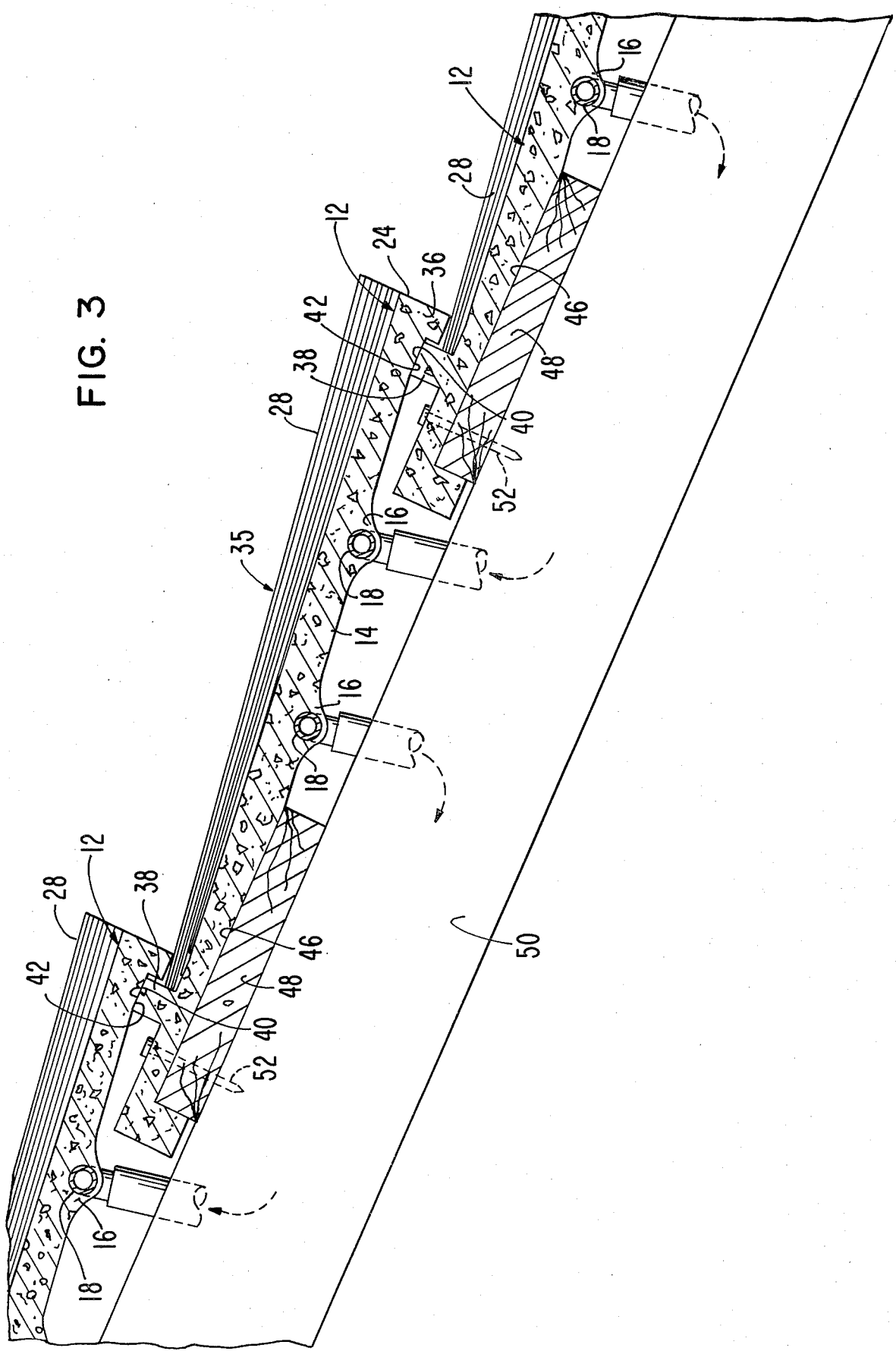

SOLAR ENERGY COLLECTOR USED AS ROOF MEMBER

This invention relates to improvements in the collection of solar energy and, more particularly, to a solar energy collector which in itself, is suitable for use as a roofing member.

BACKGROUND OF THE INVENTION

The development of solar energy collectors for the roof of a building have generally been in the direction of making collector members to be applied to an already existing roof. Moreover, such developments have been in the direction of increasing the energy collecting efficiency of various collectors of this type. Other improvements provide more advanced systems for transferring heat-bearing fluids from collector panels to heat exchangers remote from the roof of a building.

One of the main drawbacks of all such systems of this type is the objectionable appearance of the equipment visible to observers looking at the roof of a building. Such panels clearly detract from the aesthetic appearance of the building and sometimes have a psychological effect in lowering the market value of such a building. Moreover, the piping connecting the solar energy panel to a heat exchanger is also visible and further detracts from the finished appearance. Thus, the trend in solar energy collectors while directed to more efficient systems, tends to cause certain segments of the buying public to lose interest in acquiring such collectors because of their unsatisfactory appearance.

As a result of the foregoing drawbacks, a need has arisen for an improved solar energy collector which provides not only efficient energy collection and concentration but also allows for a pleasing appearance for the roof of a building on which the solar energy is to be collected.

SUMMARY OF THE INVENTION

The present invention satisfies the aforesaid need by providing an improved solar energy collector which is in the form of a roofing member suitable for use with other such roofing members to form the roof of a house or building. To this end, the solar energy collector of the present invention provides a body which is cast from a suitable material to provide essentially a roofing tile having one of several embodiments.

The cast body is provided with one or more pipe sections cast in its lower surface so that, when the body itself is heated by solar energy, the heat energy absorbed by the body will be conducted to water or other liquid flowing through the pipe section in an efficient manner. The pipe sections of the various cast bodies forming a roof can be interconnected and also connected to supply and return manifolds so as to be able to direct the heated water or other liquid to heat exchangers remote from the roof to extract the heat energy developed at the roof itself.

The solar energy collector of the present invention has projections and recesses at certain of the sides and ends thereof so that each cast body can be coupled in overlapped fashion to adjacent such bodies which together form a roof so that the bodies effectively cover the top of a building. In this way, the roof is adequately constructed although hold down means, such as roofing nails or the like are typically used to connect the various cast bodies to the under structure of the roof itself.

The primary object of this invention is to provide an improved solar energy collector in the form of a cast body having pipe sections cast in the lower portion thereof yet the body can be provided with an aesthetic appearance to enhance the character of the roof of which the body forms a part.

Another object of the present invention is to provide a solar energy collector of the type described wherein the body, because it is cast, can have an increased heat capacity as well as a suitable aesthetic appearance notwithstanding the presence of the pipe sections embedded therein for receiving heat energy by conduction from the material of the body when the body is exposed as part of a roof to solar energy.

Other objects of this invention will become apparent as the following specification progresses, reference being had to the accompanying drawing for an illustration of the invention.

Although the foregoing invention has been described in some detail by way of illustration and example for purposes of clarity of understanding, it will be obvious that certain changes and modifications may be practiced within the scope of the appended claims.

IN THE DRAWING:

FIG. 3 is a cross sectional view taken along line 3—3 of FIG. 2; and

Figure 1:
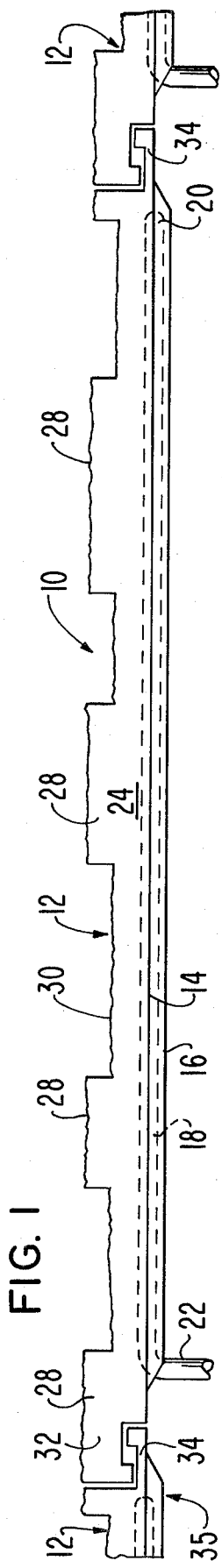
FIG. 1 is a front elevational view of a solar energy collector for use as a roofing material, showing the way the collector is coupled to adjacent solar energy collectors to form a roof.
Figure 2:
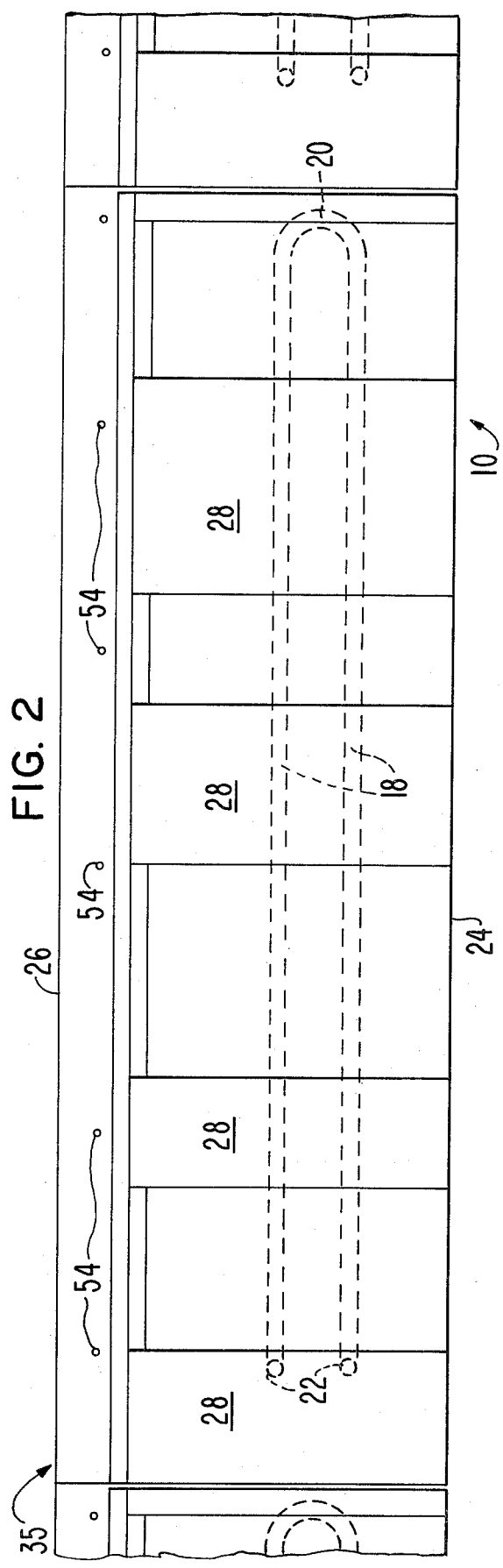
FIG. 2 is a top or plan view of the solar energy collector of FIG. 1.

The solar energy collector of this invention is broadly denoted by the numeral 10 and includes a body 12 of a cast material having a length as shown in FIGS. 1 and 2 and a width less that the length. Typically, the length is about 48 inches and the width is about 15 inches. Body 12 has a lower surface 14 provided with at least a pair of enlargments or bosses 16 (FIG. 3) in which pipe sections 18 are embedded. Sections 18, for purposes of illustration, are connected together at one end by a U-shaped tubular section 20 and adapted to be coupled at the opposite ends 22 to a suitable manifold so that water can be directed through pipe sections 18 to absorb solar heat by conduction from body 12 when the latter is exposed to solar energy. Sections 18 are located generally centrally of the front and rear marginal edges 24 and 26 (FIG. 2) although they can be at other locations as desired. The pipe sections run longitudinally in body 12 to take advantages of the greater surface area as a result.

Body 12 is provided with a number of ridges 28 on the upper surface 30 thereof. Ridges 28 are randomly spaced relative to each other and have random widths as desired. A typical arrangement of ridges is as shown in FIGS. 1 and 2. These ridges have a two-fold purpose. They increase the heat capacity of body 12 and they provide an aesthtic appearance for the body. The increased heat capacity allows the body to absorb and store more solar heat energy than would be possible without the ridges. The aesthetic appearance is provided because the ridges can be placed wherever they are desired to provide a specific architectural effect.

Body 12 has a thick style overlapping end part 32 (FIG. 1) which is adapted to be overlapped with a lower laterally projecting end part 34 of the next adjacent body 12 to form part of a roof 35 of a building such as a house, garage, or the like. Similarly, the opposite end of body 12 has a projecting part 34 which underlies the thick butt style overlapping end 32 of the right hand adjacent body 12 of roof 35. This assures a positive coupling between adjacent bodies 12 and prevents any substantial lateral movement of the bodies once they are installed as roofing elements on roof 35.

As shown in FIG. 3, each body 12 has a front projection 36 depending from the front end face 24 of the body, and an upwardly extending rear rib 38 adjacent to the space forwardly from the rear face 26 of the body. Projection 36 is adjacent to and forwardly of rear rib 38 the next forward body 12. Also, each rib 38 has a flat top surface 40 which abuts a flat face 42 on the bottom surface 14 of body 12. Surfaces 40 and 42 are generally parallel with the upper surfaces 46 of longitudinal 1×6 supports 48 secured by nails to roof rafters 50, only one of which is shown in FIG. 3.

Each body 12 provides a roofing tile cast in concrete, plastic, magnesium oxy-chloride, clay asbestos-cement or the like with integral color or color coating. Body 12 can be reinforced if required with fiber glass, sisal, hemp, wire, asbestos or the like. The bodies 12 can be secured by galvanized nails 52 to supports 48, the nails extending through the holes 54 (FIG. 2) near the rear face 26 to secure bodies in place.

In use, the roofing bodies 12 are mounted on longitudinal members 48, starting with the lowest row of bodies 12. Compatible tile without pipes can be cut to secure a proper fit on the roof. Also, compatible trim pieces, such as cornesses, valleys, ridges and the like can be provided as part of the complete roofing system. As the second layer is placed on the roof, projections 36 of each body 12 of the second layer is placed in front of and adjacent to the corresponding rib 38 of the adjacent body 12 of the first row and so on until the roof is completed. The pipe sections 18 of the various body 12 can be connected together or to manifolds in any suitable manner. For instance, as shown in FIG. 3, the rear of pipe section 18 of the right hand body 12 is connected to the front pipe section 18 of the next body 12 to the rear and in this way, the pipe sections can define a series circuit for the flow of water therethrough. The pipes are coupled with respective manifolds (not shown) for supply and return flow.

Figure 4:
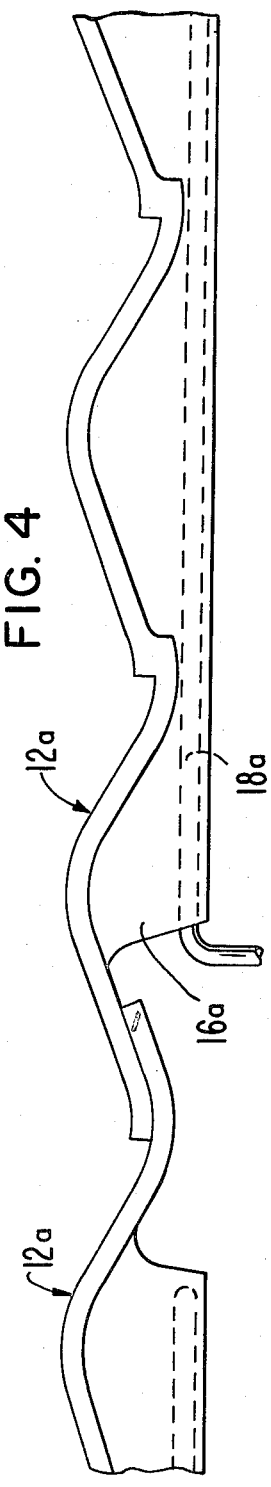
FIG. 4 is a view similar to FIG. 1 but showing another embodiment of the solar energy collector of this invention as used as a roofing material.

FIG. 4 illustrates another embodiment of the roofing body of this invention and includes a solar energy collector 10a of the "mission style" type. In this case, a body 12a has an undulating upper surface 30a and a specific length, such as 48 inches, and a width of typically 15 or 18 inches. Integral with body 12a on its lower surface is a pair of cast projections 16a, only one of which is shown in FIG. 4. Pipe sections 18a are cast in projections 16a and are thereby embedded in body 12a. The pipe sections are coupled in any suitable manner to suitable supply and return manifolds. The material of body 12a can be of the type described above with respect to body 12 (FIGS. 1–3) and fastening means can be provided to secure body 12a to roofing members 48 (FIG. 3) in any suitable manner so that adjacent body 12a overlaps in the manner as shown in FIG. 4.

The undulating character of body 12a presents spaced ridges which increase the heat capacity of the body yet provide an aesthetic appearance therefor.

Thus, a greater amount of heat energy can be absorbed and stored in body 12a yet it has an architecturally acceptable appearance notwithstanding its solar heat collecting characteristics.

We claim:

1. A solar energy collector for use as a roof member comprising: a rigid, solid body cast from a moldable, heat-absorbing material and having a top surface, a bottom surface, a pair of opposed side margins, and a pair of opposed end margins, said body having a lower surface provided with a projection integral therewith and extending between one of said pair of margins; and a pipe section embedded in the projection of said body to form a one-piece construction with the body, said pipe section being in heat exchange relationship to the material of said body and adapted to be coupled to a manifold, said body having a number of spaced ridges on the upper surface for increasing the heat-capacity thereof, there being joining means on the side and end margins of the body to permit said body to be used with other, identical bodies to form the roof of a building with one side margin of each body overlapping the corresponding side margins of the next adjacent body and with one end margin of each body overlapping the corresponding end margin of the next adjacent body.

2. A solar energy collector as set forth in claim 1, wherein the ridges have flat upper surfaces spaced above the upper surface of the body.

3. A solar energy collector as set forth in claim 1, wherein the body has an undulating upper surface integral therewith and extending between the side margins thereof, the highest extremities of said upper surface defining said ridges.

4. A solar energy collector as set forth in claim 1, wherein one side margin of the body has an open top, side recess and the opposite side margin has a downwardly extending side projection, the recess being adapted to receive the side projection of the body adjacent thereto, and the side projection of the body being adapted to be received in the side recess of the next adjacent body, the lower surface of the body near one end margin having an elongated, downwardly extending first projection and the upper surface near the opposite end margin having an elongated, upwardly extending second projection, the first and second projections having flat outermost surfaces.

5. A solar energy collecting roof for a building comprising: a plurality of rigid, solid bodies, each body being formed from a moldable, heat-absorbing material and having a top surface, a bottom surface, a pair of opposed side margins, and a pair of opposed end margins, there being joining means on the side and end margins to permit adjacent bodies to be arranged in the form of a roof with one side margin of each body overlapping a respective side margin of the next adjacent body and with one end margin overlapping a respective end margin of the correspondingly adjacent body, the upper surface of each body having a number of spaced ridges for increasing the heat capacity of the body, each body having at least one elongated projection integral therewith on said lower surface thereof and a pipe section embedded in the projection to form a one-piece construction with the pipe section being in heat exchange relationship with the material of the body, the pipe sections of said bodies adapted to be coupled with manifold means for permitting a liquid to flow through the pipe sections and thereby into heat exchange relationship with respective bodies.

6. A roof as set forth in claim 5, wherein each body has a pair of spaced, generally parallel projections integral with the lower surface thereof, said projections extending between the side margins of the body, there being a pipe section embedded in each projection, respectively, the pipe sections of each body being in fluid communication with each other near one end margin thereof.

* * * * *